Patented Sept. 29, 1931

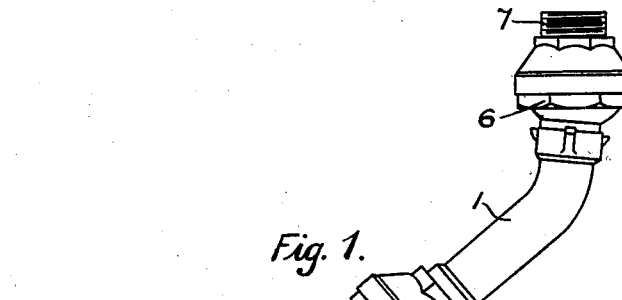
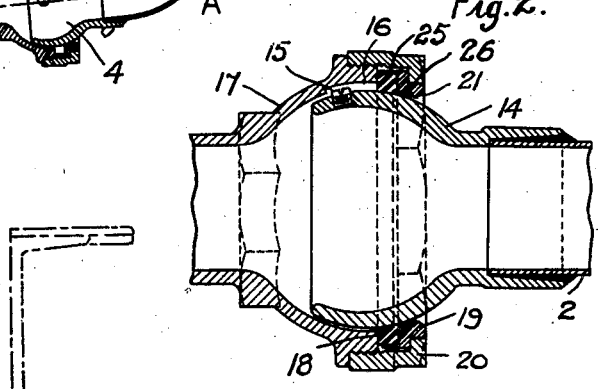
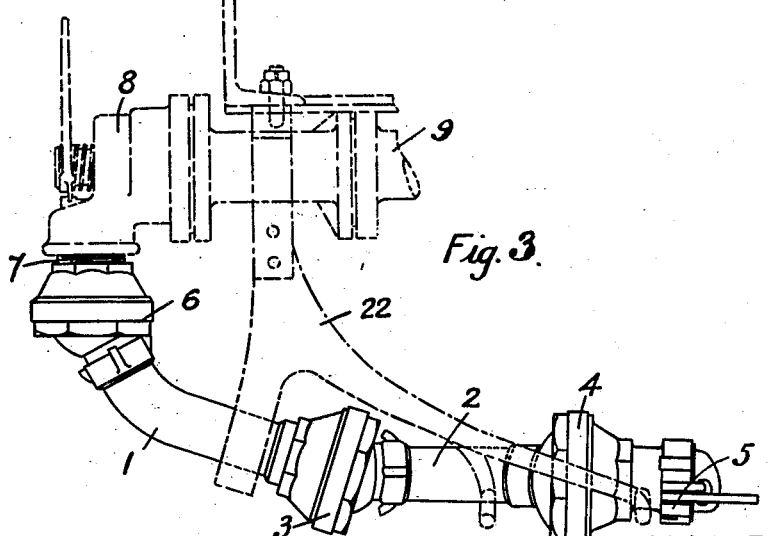

1,824,792

UNITED STATES PATENT OFFICE

FRANÇOIS LOUIS RENÉ REURE, OF PARIS, FRANCE

METALLIC PIPE COUPLING

Application filed June 27, 1929, Serial No. 373,995, and in France March 12, 1929.

This invention relates to metallic pipe couplings for steam heating conduits employed in connection with railway vehicles and for other purposes and has for its object to provide an improved construction of pipe coupling of this character, through which the flow of steam or other fluid will be permitted freely without loss of pressure.

According to the present invention the articulated sections or members of the coupling are connected to one another by joints of the ball-and-socket type, and the coupling head being integral with, or rigidly secured to one of the joint members and adapted to be rotated with respect to the cooperating joint member.

The metallic pipe coupling is arranged to permit the passage of fluid therethrough without imparting to the fluid any rapid or sudden change or changes in the direction of its flow, and the minimum cross sectional area of the passage through the coupling is arranged to be at least equivalent to that of the conduits with which the coupling is adapted to cooperate.

With this end in view the pipe couplings are preferably provided with corresponding couplings heads adapted to cooperate with one another in such a manner as to permit the flow of fluid therethrough from one coupling to the other without deflection due to the construction of the joint and the rigid sections of the coupling may be arranged to be connected to one another by means of ball joints which permit unrestricted flow of fluid through the coupling without rapid or sudden changes in the direction of flow and enable the necessary coupling and uncoupling movements to be effected while imparting the necessary flexibility to the coupling to provide for all movements occuring during use.

In order that the invention shall be readily understood it will now be described by way of example with reference to the accompanying drawings in which:

Figure 1 is a view of the improved pipe coupling with the ball joint adjacent its coupling head shown in section.

Figure 2 is a sectional view on a larger scale, of the said ball joint on the line A—A of Figure 1.

Figure 3 is a view of the coupling supported upon a suitable bracket provided at the end of a vehicle.

Referring first to Figures 1 to 3 of the drawings the pipe coupling comprises two rigid sections 1 and 2 connected together by means of a ball-joint 3. The section 2 is connected by means of a ball-joint 4 to a coupling head 5 and the section 1 is connected by means of a ball-joint 6 to an externally screw-threaded tubular portion 7 adapted to cooperate with an internally screw-threaded end cock 8 mounted at the end of the rigid steam heating or other conduit 9 installed on the vehicle.

The coupling head 5 is adapted to cooperate with a corresponding coupling head, the joint formed between the heads being in a plane substantially at right angles to the end portion of the lower section 2 of the coupling, the passage through the cooperating coupling heads being substantially straight so that fluid is permitted to flow from one coupling to the adjacent coupling through the coupling heads without any rapid or sudden change of direction of flow such as would occur were coupling heads of the prior art utilized.

Referring now again to the coupling constructed in accordance with the present invention as illustrated in the drawings, it will be observed by reference more particularly to Figures 1 and 2 that the cross sectional area of the passage through the ball joint is at no position less than that of the section 2 to which it is connected, the cross sectional area of the latter being arranged to correspond to that of the conduit 9 (Figure 3).

Stop bolts 15 (Figure 2), provided in the ball member 14 of the joint are adapted to cooperate with recesses 16 in the internal wall of the external ball joint member 17, these recesses being arranged to extend around a portion only of the circumference of the member 17 so as to limit the degree of rotary movement of the head 5 with respect to the section 2 while permitting sufficient inclination of the section 2 in any direction with respect to the coupling head, the joint being maintained substantially fluid-tight during all relative movement of the joint members by means of the rubber ring 18 and joint-ring 19 of special form adapted to be maintained in position by the securing member 20 of the ball joint. It will be observed that the joint ring 19 carries a resilient ring 26 engaging the surface of the ball member 14, so that longitudinal movement of the ball member 14 relative to the socket member 17 is permitted, and that the edge of the joint ring 19 is bevelled at 21, the object being to permit greater angular displacement of the members of the coupling with respect to one another than would otherwise be possible.

As clearly shown in Fig. 2 of the drawings, the resilient packing ring 18 engages parallel seating surfaces on the socket member 17 and the securing ring member 19 and the ring member 19 is provided with an annular flange 25 extending axially, and against which the ring 18 abuts when stretched radially.

As a result, when the ball member 14 and the socket member 17 are axially displaced relative to one another under the action of fluid pressure within the coupling, or due to any other force, the resilient ring 18 is also stretched radially outward and since the ring 18 abuts the flange carried by the ring member 19, the ring 18 will be expanded against the parallel seating surfaces of the socket member 17 and the securing ring member 19, so as to ensure a leak tight joint in case the ball and socket members of the coupling are axially displaced relative to one another.

The form of the sections 1 and 2 and the degree of relative movement permitted between these parts and the parts 5 and 7 is such that all movements of the pipe coupling during use owing to relative movements between the vehicles, etc., are freely permitted without strain, while coupling and uncoupling movements are also freely permitted, the position of the pipe coupling when not in use being illustrated in Figure 4 in which the coupling is shown as supported by its head and sections 1 and 2 upon a suitable bracket 22.

The other ball joints of the coupling, illustrated in the drawings, namely the ball joints 3 and 6 may be similar in construction to the ball joint 4.

Three ball joints are provided in the coupling illustrated in the drawings but any suitable number of joints may be provided as desired to suit particular requirements. For example, the ball joint 3 may be omitted, in which case the section 2 would constitute a continuation of the section 1 and preferably not be curved at its lower end but have its axis in alignment with the axis A—A of the ball member 14, the axis of the external member 17 being inclined to the axis of the coupling head 5. In any case the sections of the coupling between the ball joints, whatever number of the latter are provided, are such and so located with respect to the ball joints that the axes of the latter cannot be brought into alignment with one another under any conditions, thus avoiding the possibility of damage occurring to the coupling owing to thrusts or the like thereon.

It will be evident that the invention is not limited to the particular construction and arrangement of parts hereinabove described which may be varied as desired to suit particular requirements without exceeding the scope of the invention.

Having now described my invention, what I claim as new and desire to secure by Letters Patent, is:—

1. In a ball and socket joint for a metallic pipe coupling, the combination with a ball member and a cooperating socket member, of a securing ring member carried by said socket member, and carrying a resilient ring engaging said ball member and permitting relative longitudinal movement of said ball member with respect to said socket member, a resilient packing ring engaging said ball member at one side of a diameter of the ball member and engaging parallel seating surfaces on the socket member and the securing ring member, a nut engaging a flange of said securing ring member and having screw-threaded engagement with said socket member, and a cylindrical flange carried by said securing ring member and engaging said resilient packing ring, to prevent radially outward movement of said packing ring and thereby cause said resilient packing ring to expand laterally against said parallel seating faces upon a longitudinal movement of the ball member relative to the socket member.

2. In a ball and socket joint for a metallic pipe coupling, the combination with a ball member and a cooperating socket member terminating in a radial face, a nut having screw-threaded engagement with said socket member, a securing ring member having a radial face engaged by a radial face of said nut and carrying a resilient ring engaging said ball member and permitting relative longitudinal movement of the ball member with respect to said socket member, a resilient packing ring engaging said ball member at one side of a diameter of the ball member and engaging the radial face of said socket member and a parallel radial face of said securing ring member, and a cylindrical flange carried by said securing ring member and engaging said resilient packing ring, to prevent radially outward movement of said packing ring and thereby cause said resilient packing ring to expand laterally against said parallel seating faces upon a longitudinal movement of the ball member relative to the socket member, said cylindrical flange being spaced from said nut to avoid frictional engagement of said flange with said nut, upon rotation of the nut.

In testimony whereof I have hereunto set my hand.

FRANÇOIS LOUIS RENÉ REURE.